(12) United States Patent
Lewis et al.

(10) Patent No.: US 7,465,770 B2
(45) Date of Patent: Dec. 16, 2008

(54) ENVIRONMENTALLY DEGRADABLE POLYMERIC COMPOUNDS THEIR PREPARATION AND USE AS HOT MELT ADHESIVE

(75) Inventors: David Neal Lewis, Oldehove (NL); Gerrit Schutte, Hardenberg (NL); Henk Westerhof, Tijnje (NL); Jane Janssen, Emmen (NL); William E. Kelly, Bailey, CO (US)

(73) Assignee: Tate & Lyle Public Limited Company, London (GB)

( * ) Notice: Subject to any disclaimer, the term of this patent is extended or adjusted under 35 U.S.C. 154(b) by 90 days.

(21) Appl. No.: 10/469,690

(22) PCT Filed: Mar. 4, 2002

(86) PCT No.: PCT/NL02/00137

§ 371 (c)(1), (2), (4) Date: Feb. 27, 2004

(87) PCT Pub. No.: WO02/070583

PCT Pub. Date: Sep. 12, 2002

(65) Prior Publication Data

US 2004/0143072 A1    Jul. 22, 2004

(30) Foreign Application Priority Data

Mar. 2, 2001    (EP) .................................. 01200800

(51) Int. Cl.
*C08G 63/08*    (2006.01)

(52) U.S. Cl. ....................... 525/415; 525/411; 528/354; 156/352

(58) Field of Classification Search ................ 525/411, 525/415; 528/354; 156/332
See application file for complete search history.

(56) References Cited

U.S. PATENT DOCUMENTS

| | | | |
|---|---|---|---|
| 4,057,537 A | 11/1977 | Sinclair | |
| 5,028,667 A | 7/1991 | McLain et al. | |
| 5,169,889 A | 12/1992 | Kauffman et al. | 524/270 |
| 5,252,646 A * | 10/1993 | Iovine et al. | 524/270 |
| 5,312,850 A | 5/1994 | Iovine et al. | 524/47 |
| 5,399,666 A | 3/1995 | Ford | |
| 5,583,187 A * | 12/1996 | Sharak et al. | 525/438 |
| 5,616,657 A * | 4/1997 | Imamura et al. | 525/437 |
| 5,646,217 A | 7/1997 | Hammond | |
| 5,700,344 A * | 12/1997 | Edgington et al. | 156/336 |
| 5,719,256 A * | 2/1998 | Tamai et al. | 528/361 |
| 5,747,637 A * | 5/1998 | Shinoda et al. | 528/354 |
| 5,753,724 A * | 5/1998 | Edgington et al. | 523/124 |
| 5,908,918 A | 6/1999 | Chen et al. | |
| 6,770,717 B2 * | 8/2004 | Kim et al. | 525/403 |
| 2002/0198332 A1 * | 12/2002 | Kasemura et al. | 525/450 |

FOREIGN PATENT DOCUMENTS

| | | |
|---|---|---|
| EP | 0699800 A2 | 3/1996 |
| EP | 0765913 A1 | 4/1997 |
| EP | 0 741 177 | 3/1999 |
| EP | 0992529 A2 | 4/2000 |
| WO | WO94/10257 | 5/1994 |
| WO | WO 94/11441 | 5/1994 |

OTHER PUBLICATIONS

Derwent abstract of DE 4300420 A1, Sterzel, Jul. 1994.*
English language translation JP 10 120 773, May 1998.*
M. Penco, L. Sartore, F. Bignotti, S. D'Antone, L. Di Landro; Thermal properties of a new class of block copolymers based on segments of poly(D,L-lactic-glycolic acid) and poly(e=caprolactone); European Polymer Journal; ; 2000; pp. 901-908; vol. 36; Elsevier Science; Great Britian.
A. J. Nijenhuis, D. W. Grijpma and A. J. Pennings; Crosslinked poly(L-lactide) and poly (e-caprolactone) 1996; pp. 2783-2791; vol. 37; No. 13; Elsevier Science; Great Britian.

* cited by examiner

*Primary Examiner*—Margaret G Moore
(74) *Attorney, Agent, or Firm*—Williams, Morgan & Amerson, P.C.

(57) ABSTRACT

The invention is directed to a method for preparing an environmentally degradable polymeric compound as well as to such a compound per se and to its use. A compound of the present invention includes a polycondensated lactic acid containing polymer, having a molecular weight (Mw) of from 500 to 50,000 g/mol, to which a flexibilizing aliphatic polyester having a molecular weight of from 500 to 50,000 g/mol is coupled. The amount of lactic acid including groups in the polymeric compound ranges from 50 to 99% and the amount of flexibilizing polyester groups ranges from 1 to 50%.

24 Claims, No Drawings

ENVIRONMENTALLY DEGRADABLE POLYMERIC COMPOUNDS THEIR PREPARATION AND USE AS HOT MELT ADHESIVE

TECHNICAL FIELD OF THE INVENTION

The invention is directed to environmentally degradable polymeric compounds as well as to methods for preparing these compounds and to their use.

DESCRIPTION OF RELATED ART

Hot melt adhesives and coatings are used for a wide variety of commercial applications. The primary advantage of hot melt adhesive and coating systems is that these systems require no carrier fluid or solvent for application to a substrate and, as a consequence, the need for subsequent evaporation of solvent or carrier fluid is eliminated. The lack of a drying or evaporation step allows these hot melt adhesive and coating systems to eliminate the hazards associated with use of solvents and the environmental impact of volatile organic compounds (VOC). Hot melt adhesive formulations can be varied over a wide range of adhesive properties from pressure sensitive to non-pressure sensitive in character. Pressure sensitive adhesives are used in applications where room temperature tack and long open times are required. Examples of such applications are adhesive tapes, disposable products like diapers, sanitary and incontinence pads. Non-pressure sensitive hot melts are used in applications like carton sealing, paper bag end sealing, telephone book and catalogue book-binding. Hot melt coating applications would include food trays, deli trays, disposable paper carton containers or other containers where a gross barrier would be needed.

Hot melt adhesives and coatings have typically been based on petroleum based polymers. Thermoplastic elastomers are used as the polymer component in the hot melt adhesives, which generally fall into three types: 1. petroleum based polymers such as polyethylene, polypropylene, ethylene-vinyl acetate, styrene block copolymers (e.g. styrene isoprene styrene, styrene butadiene styrene); 2. polyurethanes; and 3. polyester/polycarbonate materials.

These commercially available thermoplastic elastomers have certain drawbacks in their properties and manufacturing. The styrenic block copolymers are usually made by ionic polymerization that require the exclusion of oxygen and moisture of the system. The viscosity is high and the softening point is low. The polyurethanes are not thermally stable. Polyester must be synthesized under high temperature and vacuum. Moreover, they are very resistant to degradation. Recently, biodegradable hot melt adhesives were developed. Usually, hot melt adhesives are formulations containing base resins combined with plasticizers, tackifiers and other additives in order to reach diversified adhesive properties. In typical hot melt formulations, tackifier agents, plasticizers, and extenders like waxes are used to vary adhesion and flow characteristics. These products have the disadvantage of poor environmental degradability.

There is a strong need for packaging materials in which renewable resource materials like paper, starch, and certain degradable plastics (aliphatic polyesters, polylactides, etc.) are used. In the case of paper products, use of environmentally degradable (i.e. compostable or biodegradable) adhesives would allow composting of the glue or coating residue, when the paper or cardboard product is recycled. Or alternatively, composting of the entire paper product, unlike those coated or sealed with typical petroleum based hot melt formulations.

The term "environmentally degradable" as used herein, refers to products which are compostable and/or biodegradable, as is reflected by a substantial loss of mechanical properties (tensile strength, elongation to break, toughness) or structural integrity (breaks into small pieces) upon contact with moisture at ambient or elevated temperature conditions (for example, in a composting operation) during a prolonged period, i.e. typically more than one month. This loss of mechanical properties leads to complete degradation of the environmentally degradable product when it is subjected to the above-mentioned conditions during a period of typically two years.

Blends of polylactides and polycaprolactons for film applications are known from DE 4300420. This publication describes the reaction of polylactide and polycaprolacton via a ring opening reaction.

EP A 0765913 describes a copolymer of high molecular weight polycondensated polylactic acid polymer with C4-C20 aliphatic carboxylic acid polymer. The polymers are used to prepare packaging products via moulding, film extrusion, fibre extrusion and the like. The blocks have a long length, resulting in polymers with a high mechanical strength. The process to prepare these polymers requires the removal of residual monomer.

U.S. Pat. No. 5,646,217 describes the transesterification of poly (hydroxyalkonates) with polycaprolactone or polylactide using titanium n-butoxide and antimony oxide. The used building blocks are long chain components having a molecular weight of more than 50,000 g/mol and are used for a very high molecular weight blend. The polymers may be used for applications like films, moldings and shaped articles.

EP 0992529 A2 describes melt blending and controlled transesterification to modify blocks of ring opened polyglycolide, polyglycolide-lactide copolymers to make filaments for suture applications with a controlled block copolymer structure.

SUMMARY OF THE INVENTION

It is an object of the present invention to provide a material that is environmentally degradable and that may be used as a melt adhesive, as a hot melt coating or as an impact modifier in high molecular weight polymers such as polylactide or polylactide-polyglycolide copolymers.

Another object of the invention is to provide a novel method to prepare an environmentally degradable material suitable as a hot melt base resins.

In the art, several methods are known for providing environmentally degradable polymers. Patent publications WO-A-94/10257, U.S. Pat. No. 5,252,646, and U.S. Pat. No. 5,312,850 disclose compositions comprising 20 wt. % to 98 wt. % of a polylactide (PLA) homo- or copolymer containing at least 20 molar percent of the lactide component; 2 to 80 wt. % of a polar tackifier having a Ring and Ball softening point (as described by ASTM E-26) greater than 60° C.; 0 to 50 wt. % of a plasticizer; 0 to 30 wt. % of a wax diluent; 0 to 3 wt. % of a stabilizer; and 0-20 wt. % of a polymer. The last component could be certain hydrophilic polymers such as starch, polyvinyl alcohol, hydroxyethyl cellulose, polyvinyl methyl ether, poly (ethylene oxide), or poly (hydroxybutyrate/hydroxyvalerate), which will function to increase the water sensitivity of the adhesives. Alternatively, it could also be a kind of thermoplastic polymer such as ethylene vinyl acetate, ethylene acrylic acid, ethylene methyl acrylate and ethylene n-butyl acrylate copolymers as well as caprolactone polymers to import flexibility, toughness and strength. These methods use polylactides or polylactic acid polymers synthesized from lactide. Lactide is a cyclic diester obtained from the intermolecular coupling of two lactic acid molecules. The process for producing and purifying lactide and subsequent polymerization of lactide to make a polylactide is expensive and often cumbersome.

Several other publications are known in which polylactic acids are used as a component in biodegradable hot melt formulation or in an adhesive film formulation. However, these hot melt or adhesive film formulations have used polylactides or polylactic acid polymers synthesized by ring opening polymerization of lactide. As stated previously, this process for making polylactide is expensive and cumbersome.

Other biodegradable hot melt adhesive formulations are known from U.S. Pat. No. 5,169,889 and EP-A-0 741 177. These publications concern the use of the aliphatic polyesters polyhydroxybutyrate and polyhydroxypentoic acid. These have generally been made by culturing specific bacteria, which incorporate these polyesters as an internal storage polyester. The process for isolating and purifying these aliphatic polyesters from the bacteria is expensive and time consuming. In most cases commercial production of these polyester by this route is economically not feasible.

However, the present inventors found that when pure lactic acid polycondensates reach a Mw of 3000-5000 g/mol they tend to stiffen. Unless indicated otherwise, the term "molecular weight" as used herein, refers to the weight average molecular weight (Mw) as measured for instance by gel permeation chromatography (GPC). Oligomers having a Mw higher than 3000-5000 g/mol may become very brittle. This is attributed to a glass transition temperature (Tg) that is too high. Moreover, the present inventors found that a lactic acid polycondensate starts to lose its surface tackiness at room temperature if polycondensate molecules reach a Mw above 3000 g/mol. The tackiness is totally gone at values of Mw above 10000 g/mol. These higher Mw polycondensates need to be in a molten state to display adhesion and to make them stick to metals, polymers, and paper.

It is an object of the present invention to provide a compound which does not have the above-mentioned disadvantages, i.e. to provide for a compound that may be used as a hot melt adhesive which is environmentally degradable and which is more flexible than the prior art compounds. Also, such a compound should provide for an improvement in at least some of the other aspects that are important in environmentally degradable hot melt resins. These aspects include: open time (defined as the time in which the hot melt still retains its adhesive character. After this time, no substantial adhesion occurs), Tg (which should be decreased), and UV curability, when applicable. Also the compounds should be relatively easy to manufacture at a lower cost than prior art methods.

It is further an object of the invention to provide a novel method to provide such a compound.

Surprisingly it was found that this object could be met by coupling aliphatic polyesters, such as polycaprolactone, to polycondensated lactic acid comprising chains, whereby the polyester groups act as a flexibilizing coupler or linker.

DETAILED DESCRIPTION OF PREFERRED EMBODIMENTS

Therefore, in a first embodiment, the present invention relates to a method for preparing an environmentally degradable copolymer compound suitable for use as a hot melt type application, said method comprising the steps of providing a lactic acid polymer, such as by polycondensating a lactic acid to form the lactic acid polymer, and then coupling said lactic acid polymer to a flexibilizing aliphatic polyester under condensation and/or transesterification reaction conditions.

Preferred examples of hot melt type applications are hot melt base resins, hot melt coatings and hot melt adhesives.

Preferably, a method according to the invention is used to prepare an environmentally degradable polymeric compound, suitable for use as a hot melt base resin or for a hot melt type application, which compound comprises 50 to 99 wt. % polylactic acid comprising chains, each of said chains having a Mw of from 500 to 50 000 g/mol, to which chains a flexibilizing aliphatic polyester having a Mw of from 200 to 50 000 g/mol, is coupled, wherein the amount of aliphatic polyester in the compound is 1 to 50 wt. %.

The molecular weight as used herein is defined as the weight average molecular weight (Mw) as determined by GPC using polystyrene as a standard.

With a method according to the invention it has been found possible to prepare an environmentally degradable polymeric compound having as structure not feasible with environmentally degradable polylactide materials previously described in the art. For example it is possible to obtain a polymer compound with different end groups at the same molecule in comparison to conventionally obtainable polymers. Further, a preferred polymer compound according to the invention has a distinct branched structure. For instance, in a more specific example, it has been found that if dimethylol propionic acid (which contains two hydroxyls and one carboxylic acid group) is used in a polycondensation reaction with lactic acid, the resulting polymer will be a three arm star polymer with one carboxylic acid terminal group and two hydroxyl terminal groups, provided the polymerization is not carried to the gelation point. The presence of carboxylic acid groups in the case of ring opening polymerization (ROP) of lactide to make polylactide will retard the polymerization, and the polymer that is formed will be essentially linear with hydroxyl termination and the carboxylic acid will have a very short chain, if any.

The present invention accordingly relates to an environmentally degradable polymeric compound, obtainable by a method according to the invention.

It is an advantage of a method according to the invention that the polycondensation reaction providing the polylactic acid blocks does not retard the polymerisation, as is the case by ring opening polymerisation.

Without wishing to be bound by theory, it is believed that the polyester species act as flexibilizing linkers or couplers between polycondensated lactic acid groups. This solves the problem of the brittleness, which is associated with pure lactic acid oligomers. The compound of the invention may, for example, be in the shape of a star having a core of polyester moiety at the core, while the arms are formed by the lactic acid oligomers. Alternatively, the compound may be in the form of a partial network containing polyester stars connected by lactic acid chains.

The molecular weight, Mw, of the aliphatic polyester, is according to the present invention from 200 to 50 000 g/mol. Values above 50 000 g/mol are generally too viscous to be mixed properly and, as a result, can usually not provide sufficient coupling sites. Polyesters having molecular weights below 200 g/mol are generally too small to provide adequate flexibility to the final compound. Preferably the Mw of the aliphatic polyester is from 1 000 to 40 000 g/mol. Very good results have been achieved with an aliphatic polyester having an Mw from 1000 to 10 000 g/mol.

The softening temperature of an environmentally degradable polymer compound according to the invention is usually less than 120° C. (as measured with by ASTM E28: Ring and Ball Method). Very good results have been obtained with a copolymer compound having a softening temperature of less than 105° C.

The glass transition temperature (Tg) of a polymer compound according to the invention is preferably 25° C. or less. The glass transition temperature, is defined herein as the glass transition temperature as measured by differential scanning calometry as outlined in ASTM method D3418 (Standard Test Method for Transition Temperatures of Polymers by Thermal Analysis).

The melt viscosity of a copolymer compound according to the invention is preferably in the range of 0.1 Pa·s to 400 Pa·s at a measuring temperature of 160° C. at a shear rate between 100 and 2000 $s^{-1}$, e.g. over a shear rate range of 250-800 $s^{-1}$. More preferred the viscosity is in the range of 0.1 Pa-s to 400 Pa-s between 100° C. and 180° C. at a shear rate between 100 and 2000 $s^{-1}$, e.g. over a shear rate range of 250-800 $s^{-1}$. The melt viscosity is used herein is defined as the value as measured using a cone and plate rheometer like the ThermoHaake RS300.

Very good results have been achieved with a polymer compound having a melt viscosity of less than 200 Pa-s at 100° C. at a shear rate in the range of $100s^{-1}$ to 2000 $s^{-1}$ (more preferably in the total range of 100-2000 $s^{-1}$) as measured using a cone and plate rheometer like the ThermoHaake RS300 in the steady shear mode as cited in the previously described comparative examples."

The extensional melt strength of a polymer compound according to the invention is preferably less than 0.5 cN (as measured on a Gottfert Rheotens Model 71.97 as described in the paper by H. M. Laun et al, "A recursive Method for Rheotens Tests", Journal of Rheology, Volume 41(3) 1997 and in A. Gottfert et al, Polym. Eng. Sci. 36(7), pp. 925-935 (1996)).

A polymer compound with such a low melt strength and/or melt viscosity has shown to be very uniformly spreadable when used.

The polylactic acid comprising groups (or chains) may according to the present invention contain fragments derived from other monomers as well. For example the chains may contain other polycondensable combinations of L-lactic acid with D-lactic acid or with D,L-lactic acid or any other hydroxycarboxylic acid, such as glycolic, hydroxycaproic, hydroxyl valeric, etc, or combinations with diols, polyols (triols, tetrols, hexyls, etc.) polymer diols, diacids, di, tri or tetra anhydrides or polyanhydrides, or aliphatic polyesters, etc. However, the majority of these groups, i.e. at least 75 and preferably at least 95 mol %, should be derived from lactic acid. Most preferably, however, these groups consist essentially of polylactic acid. The Mw of the polylactic acid comprising groups should be from 500 to 50 000 g/mol. Again, values above 50 000 g/mol are generally too viscous to be mixed properly and, as a result, can usually not provide sufficient coupling sites. Polylactic acid chains having Mw values below 500 g/mol will result in a system requiring an extensive polycondensation time to reach acceptable properties. Preferably the Mw of the polylactic acid comprising groups is from 1500 to 40 000 g/mol, more preferably 1500 to 10 000 g/mol. The polylactic acid comprising groups should be present in the compounds of the invention in an amount of from 50 to 99 wt. %.

Suitable aliphatic polyester are functionalized polycaprolactones, in particular polycaprolacone polyols (diols, triols, tetrol or higher).

The flexibilizing aliphatic polyester may be a polymer or copolymer of hydroxycarboxylic acids, which is optionally substituted with hydroxy groups. Preferred compounds are polycaprolactone diol, polycaprolactone triol and polycaprolactone tetrol.

Hot melt base resins of the current invention may be produced by controlled polycondensation of L-lactic acid, D-lactic acid or D,L lactic acid (also known as 2-hydroxypropanoic acid) in the presence or absence of a catalyst followed by a condensation coupling reaction with the aliphatic polyesters to produce hot melts base resins with the desired flowability or viscosity, flexibility, pot life, open or setting time, tensile strength and extensibility.

The hot melt base resins of the present invention may also include any polycondensable combinations of L-lactic acid with D-lactic acid or with D,L-lactic acid or any other hydroxycarboxylic acid (glycolic, hydroxycaproic, hydroxylvaleric, etc) or combinations with diols, polyols (triols, tetrols, hexyls, etc) polymer diols, diacids, di, tri or tetra anhydrides or polyanhydrides, or aliphatic polyesters.

The polycondensed polymer of the present invention may be prepared without catalyst in the presence of heat and sufficient vacuum or in the catalysts which promote esterification or transesterification. This type of reaction is carried out relatively more simply than ring-opening polymerization.

Suitable catalysts for this purpose are conventional transesterification catalysts, which comprise tin(II), tin(IV), iron (II), iron(III), zinc, calcium and/or magnesium metals; for example stannous oxide, stannous chloride, stannous bis 2-ethyl hexanoate (also known as stannous octoate), stannous acetate, stannous acetylacetonate, stannous lactate and zinc salts like zinc stearate, zinc oxide, zinc chloride, zinc lactate, iron (III) salts like ferric acetate and ferric lactate, etc. Preferred catalysts are stannous oxide and stannous chloride. Other suitable catalysts for this purpose are transition metal catalysts: e.g. aluminum, iridium, titanium, nickel, chromium, vanadium, hafnium, manganese, tungsten, tantalum, platinum, palladium, samarium, gallium, germanium, indium, cobalt, rhodium, rhenium, ruthenium, thallium, bismuth, cadmium, thorium and/or zirconium comprising compounds, which may be used in combination with the above-mentioned conventional transesterification catalysts. Also suitable are rare earth catalysts: e.g. europium, yttrium, erbium, dysprosium, holmium, neodymium, gadolinium, lutetium, lanthanum, praseodymium, terbium, thulium and/or ytterbium comprising compounds, which may also be used in combination with the above-mentioned conventional transesterification catalysts or transition metal catalysts.

The above-mentioned catalysts may also be used in combination with acidic catalysts, such as sulfuric acid, phosphoric acid, hydrochloric acid, methanesulfonic acid, toluene sulfonic acid.

The preparation may be carried out using conventional polymerization and polycondensation techniques.

The synthesis may be carried out using a two step route, in which in Step 1 the polylactic acid comprising groups are synthesized by polymerization. A catalyst may be used to decrease the reaction time. A low Mw acid or alcohol may be used as an initiator for the polycondensation, in which case a carboxylic or hydroxyl functional product is formed, rather than a bi-functional product. Other hydroxyacids then lactic acid can be used for copolymerisation as well. According to the invention a lactic acid based copolymer is obtained, having a Mw in the range of 500 to 50 000 g/mol.

Suitable reaction conditions for this first step comprise a temperature of from 150 to 260° C. preferably from 180 to 200° C., and a reaction time of 1 h to more than 20 h. The synthesis is preferably carried out in vacuum, preferably less than 15 mbar, dependent upon the amount of water present in the reaction mixture. Most preferred are pressures of 0 to 15 mbar.

Step 2 comprises the coupling of the polycondensated lactic acid oligomer made in step 1 with one or more "flexible" aliphatic polyester components by esterification and/or transesterification or via chain coupling with a chain coupling agent.

Low Mw components may also be used to change the hydroxyl/carboxyl (OH/COOH) ratio in order to attain a desired molecular weight or a desired functionality Multifunctional components may also be used to obtain a specific functionality. In this way a flexible copolymer with a molecular weight of 500 to 100 0000 g/mol may be obtained. A polymer with a molecular weight of 500 to 80 000 g/mol has been found to have particularly good properties for a hot-melt application.

Suitable reaction conditions for Step 2 comprise a reaction temperature of 160 to 270° C., preferably of from 190 to 220° C., a reaction time from 0.2 to 10 h, while the reaction is preferably carried out in vacuum, preferably below 50 mbar, most preferably from 10 to 20 mbar.

A rotary evaporator or another standard polycondensation setup may be used to carry out both steps.

The preparation may also be carried out in a single step, viz. by combining Steps 1 and 2. In this case, the components mentioned above for Steps 1 and 2 are mixed. Then the reaction is carried out at a temperature of 160 to 270° C., preferably 190 to 220° C., during 1 to more than 20 hours at a vacuum pressure of down to less than 15 mbar, depending on the amount of water present in the reaction-mixture, preferably 0 to 1 mbar. In this way, a flexible copolymer with a Mw weight (Mw) of from 700-200 000 g/mol may be obtained. In order to provide a polymer with good properties for use as an hot melt base resin or in a hot melt type application, the Mw of the polymeric compound of the invention is preferably from 700-100 000 g/mol, more preferably from 700-80 000 g/mol, even more preferably from 2000 to 50 000 g/mol.

Alternatively, the synthesis may be carried out in three steps, wherein Step 1 and 2, as described above, are followed by a Step 3, which comprises endcapping or chain extending of the polymers chain to improve the stability of the polymer, increase the molecular weight or to create different functionality or non-functionality.

L-Lactic acid, D-Lactic acid and DL Lactic acid may be used to prepare the polylactic acid comprising groups. Suitable polycondensation catalysts are the conventional catalyst used for this purpose, such as tin oxide, tin chloride, zinc stearate, toluene sulfonic acid (TSA), etc.

The aliphatic polyester, which is used as a "flexible component" may be polycaprolactone polyol (diol, triol or tetrol) with a Mw of 100 to 50 000 g/mol, preferably of 200 to 40 000 g/mol. The low molecular weight alcohols mentioned above may be selected from diols such as ethyleneglycol, propyleneglycol, butanediol, hexanediol, neopentylglycol, 1,4 dimethylolcyclohexane, 2,2,4-trimethylpentanediol-1,3,1,3-butenediol, etc.; triols such as trimethylolpropane, trimethylolethane, etc.; and polyols such as pentaerythritol, dipentaerythritol, etc.

The low molecular weight acids may be selected from dicarboxylic acids such as adipic acid, sebatic acid, succinic anhydride, maleic anhydride, hexahydrophtalic anhydride, tetrahydrophtalic anhydride, 1,4-cyclohexanedicarboxylicacid; phtalic anhydride isophtalic anhydride, etc.; and polycarboxylic acids such as trimellitic anhydride, pyromellitic dianhydride, etc.

Other low molecular weight single or multifunctional components that may be used are hydroxyacids such as dimethylolpropionic acid, etc.; lactones such as butyrolactone, ε-caprolactone, etc.; aminoacids; aminoalcohols such as taurine; hydroxysulfates; epoxies such as ethyleneoxide, propyleneoxide, Cardura E, glycidol; epoxyacrylics such as glycidylmethacrylate; and acetic anhydride Chainextenders or crosslinkers that may used in Step 3, mentioned above, are dianhydrides such as pyromellitic dianhydride; di- or tri-isocyanate such as hexamethylenediisocyanate, isophorone diisocyanate, isocyanurates, allofenates, etc.; diepoxies such as the diglycidylether of butanediol, the diglycidylether of bisphenol A, etc.; diamines such as hexanediamine, polyoxypropylenediamine, etc.; silanes; and peroxides such as benzoylperoxide, T-butyl peroxybenzoate, etc.

Polymers of the present invention produced in the initial polycondensation step have Mw values of between 500 and 50,000 g/mol, preferably 500 to 40 000 g/mol, more preferably in the range of 1500 to 10,000 g/mol. The polylactic acid comprising groups in the coupling step of the current invention can include other degradable aliphatic polyesters, such as polycaprolactones, polyester diols, polyester triols or polyester tetrols or polyester hexyls either produced by polycondensation or by ring opening polymerization. These can include copolymers of lactide or glycolide and caprolactone or copolymers comprising other monomers, which may be subjected to ring-opening, such as valerolactone. The preferred coupling polymers are polycaprolactone diols, triols or tetrols, which provide flexibility, extensibility, and a glass transition temperature (Tg) below room temperature (i.e. 25° C.) to the final hot melt base resin. The coupling reaction may include partial transesterification reactions to occur, particularly in the presence of a transesterification catalyst. The Mw of the coupling polymer can be in the range of 200 to 50,000 g/mol, preferably in the range of 200 to 40 000 g/mol and more preferably is in the range of 1000 to 10,000 g/mol. The amount of coupling polymer in the final hot melt base resin varies between 1 to 50%, preferably in the range of 10 to 30%.

The coupling of the polycondensed polymer of the first step and the polymer of the second step can alternatively be accomplished by the use of coupling agents including cyclic anhydrides, mono-, di-, tri- or tetracyclic anhydrides, polyanhydrides, cyclic or glycidal ethers, aliphatic isocynates, aliphatic polyisocyanates, silanes and chlorosilanes. Hot melt base resins of the present invention can be made ultraviolet curable by use of double bond containing diol or diacid components. Properties of the hot melt base resins can be further modified by partial crosslinking with the use of organic peroxides like cumyl peroxide, tertbutyl peroxybenzoate, tertbutyl peroxyacetate, etc.

The hot melt base resin of the present invention can also be used as a thermoplastic elastomeric modifier for high molecular weight polylactide resins or glycolic acid-lactic acid copolymers which are normally hard, brittle polymers to improve flexibility and impact properties.

Other applications include hot-melt adhesives and coatings via hot spray, laminates, tie-layers, bonding materials, additive to other polymer system for applications too numerous to mention, fiber/filament applications, potential spun bonding or melt blown for fiber formation.

One of the important aspects of this invention is that the polymer has relatively high surface tension, which allows for printing—directly without surface treatment. The resulting material is hot water resistant and not solubilized by hot water.

The end use products which may be obtained in accordance with the present invention comprise adhesive materials which are used for carton sealing, booking bindings, adhesive tapes, construction of disposable diapers, sanitary napkins, incontinence pads; coatings for food trays, deli trays, carton containers or other products where a gross water barrier is desired; and as an impact modifier for high Mw polylactide or polylactide-glycolide copolymer resins.

The invention will now be illustrated by the following, non-limiting, examples.

EXAMPLE 1

800 g of 88% L-Lactic Acid (obtained from ADM) solution is placed with 1.6 g (0.2 wt %) Tin (II) oxide (obtained from Acros) powder into a 1 dm$^3$ pear shaped flask. The flask is attached to a rotary evaporator unit. An argon purge tube is mounted in the rotary evaporator unit so it rests just below the surface of the lactic acid solution in the flask. An oil bath is set to 180° C. and raised until the pear shaped flask is partially immersed. The vacuum pump attached to the rotary evaporator unit is set to 800 mbar for 0.5 to 1 hour. The argon is bubbled through the lactic acid solution and the system maintained at 800 mbar vacuum and 180° C. temperature until almost the Tin (II) oxide disappears. The liquid will change gradually from dark gray to a hazy clear solution. The vacuum is gradually increased over the next hour to 100 mbar and the argon also subsequently reduced. After this second hour, the argon flow is stopped and the vacuum increased (or pressure reduced) to the maximum amount (5-10 mbar) and the polycondensation reaction continued for 6 hours. After this time, the vacuum is released by increasing the flow of argon; increasing the vacuum control setting to atmospheric pressure, then the flask is removed and 96 g (12%) polycaprolactone tetrol (CAPA 205042, obtained from Solvay, having a number average molecular weight (Mn) as determined by end group analysis of 8000 g/mol) is added to the pear shaped flask, after it is removed from the rotary evaporator unit. The vacuum is again set to its maximum value, the oil bath temperature raised to 195° C. and the coupling reaction allowed to take place for 4 hours. The final product is a slightly yellow liquid, which upon cooling to room temperature is a slightly flexible solid and has a Mw of 17,400.

EXAMPLE 2

Calculations in this example are based on the functional groups of the available raw material and will therefore change if different initiation cores are used. Two low Mw caprolactone species from Solvay were used; CAPA 316 (tetra-functional polyol, Mn 1000 g/mol, as determined by end group analysis) and CAPA 205042 (similar to CAPA 316 but with Mn 8000 g/mol).

The reaction ratio was based on the functional groups of the caprolactone segment (polyol). Complete reaction between the caprolactone segments and the lactic acid polycondensate segments was assumed. The molecular ratio between the tetra-functional CAPA 205042 (or CAPA 316) and a lactic acid polycondensate segment was 1:4, respectively. One part of a caprolactone segment can react with four parts of a lactic acid polycondensate segment.

At the beginning of each experiment a desired molecular weight is defined. Hereby the amount of lactic acid that is needed can be calculated, since the CAPA segment has a fixed molecular weight. For example, if the desired molecular weight of the end product is 28000 g/mol and if CAPA 205042 is used as the flexible segment, which has a Mw of 8000 g/mol, the residual Mw 20000 has to be lactic acid. For this molecular weight, approximately 20 000/(90.04−18.02) =288 coupled LA molecules are required. From this the amount of raw lactic acid could be calculated, based on the purity and concentration.

The following raw materials were used in this Example for the polycondensation synthesis:

CAPA 205042 (Solvay Interox ltd., development product, pentaerythritol initiated caprolactone Mw +/−8000 g/mol)
D,L-lactic acid (lactic acid contained about 12% H$_2$O)
L-lactic acid (lactic acid contained about 12% H$_2$O), (ADM heat stable)
Tin-catalysts
Protonic acids The following equipment was used in this Example:
Heidolph rotating evaporator
Heidolph MR2002 oil bath 50-350° C.+magnetic stirrer
Digital temperature sensor, Greisinger GTH 175/MO
Vacuum pump Welch mod 110 1007434
Vacuum regulator Leibold, Divatronic DT1

The following analyses were carried out in this Example:
molecular weight analysis by GPC, Hewlett Packard 1100 Chemstation
thermoanalysis by DSC ($T_g$ and $T_m$), Perkin Elmer Pyris1

EXAMPLE 2.1

Introduction

Polycondensation of L-lactic acid in the rotating evaporator was carried out without catalyst.
Raw Materials:
L-lactic acid
Process:
Polycondensation of L-lactic acid without catalyst

| Reaction Time (min) | Temp oil (° C.) | Press. (mbar) | Mw (g/mol) |
|---|---|---|---|
| 125 | 113-121 | 300 +/− 5 | |
| 140 | 135-143 | 200 | |
| 80 | 151-163 | 200 | |
| 135 | 152-159 | 200 | |
| 340 | 177-182 | 200 | 2111 |
| 60 | 177-182 | 600 | |
| 240 | 177-182 | 200 | |
| 120 | 185-193 | 100 | 2797 |
| 240 | 183-189 | 100 | |
| 180 | 183-189 | 50 | |
| 14 | 183-189 | 40 | 5086 |

Results:
Hard and non-sticky polycondensate, white non-transparent (probably because of crystallization). Mw: 5086 g/mol.

EXAMPLE 2.2

Introduction

Esterification of L-lactic acid polycondensate with a molecular weight of approximately 5000 g/mol with CAPA 205042 in a rotating evaporator.

Raw Materials:
The L-lactic acid polycondensate (LA PC) from Example 2.1
CAPA 205042
Process:
Polycondensation in the rotating evaporator without adding catalyst.
CAPA205042: 20.23 g
LA PC: 51.90 g

| Reaction Time (min) | Temp oil (° C.) | Press. (mbar) |
|---|---|---|
| 5 | 160-181 | 800 +/– 5 |
| 30 | 189-191 | 200 |
| 275 | 189-191 | 100 |
| 270 | 189-191 | 50 |

Results:
Material is solid and looks and feels waxy.
DSC analyses results:
$T_g = -3.2°$ C.
$T_{crystallization} = 81°$ C.
$T_{m1} = 108°$ C.
$T_{m2} = 124°$ C.
$T_{m3} = 133°$ C.
SEC analysis result:
Mw=10560 g/mol

EXAMPLE 2.3

Introduction

L-lactic acid was polycondensated until all the free water was removed from lactic acid solution. After removing the water, CAPA 205042 was added to the flask. The esterification reaction was continued in order to obtain polymer with a flexible core, having a Mw of 50 000 g/mol.
Raw Materials:
The L-lactic acid polycondensate (LA PC) from Example 2.1
CAPA 205042
Process:
Polycondensation in the rotating evaporator without adding catalyst.
L-lactic acid: 771.53 g

| Reaction Time (min) | Temp oil (° C.) | Press. (mbar) |
|---|---|---|
| 30 | 600 +/– 3 | 108 |
| 30 | 475 | 110 |
| 330 | 200 | 112 |

Results:
From the initial 771.53 g L-lactic acid, 124.88 g water was removed: (124.88/771.53)*100%=16.2%, indicating that lactic acid was already polycondensated.
Calculation of the Amount CAPA Needed:
The desired Mn is 50 000 g/mol. The CAPA segment have a Mn of 8000 g/mol the rest is Lactic acid so 42000 g/mol. The amount of CAPA needed: (647/42000)*8000=123 g. Added:
CAPA 205042: 122.90 g

| Reaction Time (min) | Temp oil (° C.) | Press. (mbar) |
|---|---|---|
| 15 | 25-110 | 800 +/– 3 |
| 40 | 110 | 800 -> 200 |
| 40 | 117 | 50 |
| 110 | 139 | 50 |
| 130 | 160 | 50 |
| 100 | 180 | 50 |

The polycondensate was opaque, slightly yellow, having little crystallinity. The polycondensate was sticky.

| Reaction Time (min) | Temp oil (° C.) | Press. (mbar) |
|---|---|---|
| 60 | 178 | 800 -> 70 |
| 180 | 189 | 70 |
| 220 | 190 | 200 + Argon flow |

Results:
Mw after one day's reaction: 2500 g/mol. After 2 days it was 4700 g/mol. The material was slightly soft, but looked and felt waxy. This indicated that the material had different phases. Probably transesterification had taken place, because the molecular weight of the CAPA had decreased.

EXAMPLE 2.4

Introduction

In this example a paperboard coating was formed by esterification of L-lactic acid with CAPA205042.
Raw Materials:
L-lactic acid
CAPA 205042
Benzoyl peroxide
Process:
L-lactic acid: 861 g

| Reaction Time (min) | Temp (° C.) | Press. (mbar) |
|---|---|---|
| 30 | 100 | 800 +/– 5 |
| 150 | 105 | 600 |
| 15 | 110 | 400 |
| 75 | 115 | 300 |
| 40 | 116 | 200 |
| 70 | 142 | 200 |
| 235 | 149-155 | 200 |
| 110 | 167-173 | 200 |
| 170 | 176-184 | 200 |
| 270 | 176-184 | 200 |
| 210 | 176-184 | 100 |
| 60 | 176-184 | 50 |

242 g water was withdrawn from the polycondensation. In the removed water, there was some lactic acid present, since the water had an odor of lactic acid. CAPA 205042 was dried in a rotary evaporator at 800 mbar and 130° C. for 6 hours.
Further synthesis:
CAPA 205042: 80 g
L-lactic acid polycondensate (see above): 200 g

| Reaction Time (min) | Temp (° C.) | Press. (mbar) |
|---|---|---|
| 30 | 133 | 800 +/− 5 |
| 45 | 144 | 800 |
| 15 | 154 | 500 |
| 30 | 156 | 200 |
| 260 | 175 | 200 |

Results:

After finishing the synthesis, the melt was applied to a piece of paperboard fruit tray with a brush. The coated tray did not feel sticky. The fruit tray was filled with water, which was left there for several hours. After removing the water the coating did not show any signs of being dissolved or softened by the water. In addition, the material was treated with 0.2 wt % of benzoyl peroxide in order to create entanglements between the molecular chains. Besides crosslinking, peroxides also act as a catalyst deactivator which enhances the stability of the polycondensate.

At first a small amount of peroxide was fed (while stirring) to the molten product at a temperature of 180° C. Regions of high cross-linking occurred because of the fast reaction of the peroxide (probably because of the high temperature). The temperature of the melt was lowered to approximately 125-130° C. and the rest of the peroxide was added. After the addition the melt was rotary evaporated to react for 120 minutes. The flexibility of the coating increased.

EXAMPLE 2.5

Introduction

In this experiment L-lactic acid polycondensate together with the CAPA 205042 was polycondensated in the presence of $SnCl_2.2H_2O$ and TSA.

Raw Materials:
L-lactic acid polycondensate (Mw ~1200 g/mol)
CAPA 205042 (Mn ~8000 g/mol)
$SnCl_2.2H_2O$
p-Toluene sulfonic acid mono hydrate 99% (TSA)
Process:
Step 1: Polycondensation of L-Lactic Acid Pre-Polycondensate with 0.3 wt % $SnCl_2.2H_2O$ and 0.3 wt % TSA.
L-lactic acid polycon: 589 g
$SnCl_2.H_2O$: 1.8 g
TSA: 1.8 g
Step 2: Addition of CAPA 205042.
CAPA 205042: 110.14 g

| Reaction Time (min) | Temp (° C.) | Press. (mbar) |
|---|---|---|
| 70 | 180 | 38 +/− 3 |
| 20 | 180 | 25 |
| 110.14 g of CAPA 205042 was added | | |
| 330 | 193 | 20 |
| 405 | 200 | 20 |

Results:

The polycondensate looked brownish. The material was very flexible, non-sticky and found to be water resistant. The material could be used as a flexible coating. Molecular weight analyses by GPC: Mw approximately 37000 g/mol (Dispersion=5.7). DSC analyses: $T_g=-20°$ C.

EXAMPLE 2.6

In this experiment L-lactic acid was pre-polycondensated until all the free water was removed and the lactic acid was slightly polycondensated. Then CAPA 205042 was added to the lactic acid polycondensate and the reaction was continued for a certain period of time. In the last stage of the reaction $SnCl_2\ 2H_2O$ and TSA were added.

Raw Materials:
L-lactic acid
CAPA 205042 (Mn ~8000 g/mol)
$SnCl_2.2H_2O$
p-Toluene sulfonic acid mono hydrate 99% (TSA)
Process:
Stage 1) polycondensation of L-lactic acid
Stage 2) addition of CAPA 205042
Stage 3) addition of $SnC_{12}H_2O$ and TSA
L-lactic acid after 1 stage: 801.7 g
CAPA 205042: 153.3 g
$SnCl_2.H_2O$: 2.4 g
TSA: 2.4 g

| | Reaction Time (min) | Temp (° C.) | Press. (mbar) |
|---|---|---|---|
| Stage 1 | 105 | 132 | 600 +/− 3 |
| | 70 | 137 | 500 |
| | 25 | 139 | 400 |
| | 40 | 139 | 200 |
| 153.3 g of CAPA 205042 was added | | | |
| Stage 2 | 10 | 134 | 200 +/− 3 |
| | 35 | 153 | 200 |
| | 65 | 170 | 200 |
| | 40 | 180 | 100 |
| | 76 | 182 | 80 |
| | 24 | 184 | 40 |
| | 55 | 184 | 30 |
| | 75 | 199 | 30 |
| Temp set to 150° C. and Press. to 800 mbar. | | | |
| Then 2.4 g $SnCl_2 \cdot H_2O$ and 2.4 g TSA was added | | | |
| Stage 3 | 30 | 150 | 800 +/− 3 |
| | 80 | 180 | 800 |
| | 35 | 180 | 100 |
| | 85 | 180 | 50 |
| | 90 | 180 | 35 |
| after 8 days | 30 | 165-175 | 100 +/− 3 |
| | 50 | 192 | 35 |
| | 110 | 193 | 30 |
| | 260 | 193 | 25-30 |
| after 9 days | 90 | 193 | 25 +/− 3 |
| | 75 | 193 | 20 |
| | 300 | 193 | 15 |

Results:

The colour of the polycondensate looked brownish. The product was very strong, flexible, not tacky and very good water resistant.

Analytical results:
Mw at the end of the stage 2: 2200 g/mol.
Mw at the end of the stage 3: 4648 g/mol
Mw after 8 days: 15098 g/mol
Mw finished product: 21740 g/mol

EXAMPLE 3

Hot-melt glues were prepared along the lines indicated in the previous examples by using the following materials and procedures:

| Ingredient | Amount | Procedure |
|---|---|---|
| L-lactic acid (88%) | 800 g | Rotavaporator at 180° C. |
| SnO | 1.6 g (0.2 wt % of A)the lactic acid) | Stepwise reduction of the pressure to about 100 mbar for 6 hours |
| CAPA 205042 | 96 g (12 wt % of A)the lactic acid) | Temp 195° C., p = 5 mbar; additional 4 hours |

Average properties of the glues were found to be:

| | |
|---|---|
| Extensibility: | >500% |
| Open Time: | >40 s |
| Viscosity: | ~1000 mPas |
| Weight loss stability (~160° C.): | |
| after 3 h: | 5% |
| after 7 h: | 8% |
| after 24 h: | 25% |

Additional glue formulations for hot-melt applications were prepared as described in Example 3. The molar mass and its distribution are given in the following table.

| Example No. | Polycondensate | | | Glue | | |
|---|---|---|---|---|---|---|
| | $M_w/$ [gmol$^{-1}$] | $M_n/$ [gmol$^{-1}$] | MWD | $M_w/$ [gmol$^{-1}$] | $M_n/$ [gmol$^{-1}$] | MWD |
| 3-2 | 9 100 | 7 000 | 1.30 | 28 800 | 6 100 | 4.75 |
| 3-3 | 4 600 | 1 500 | 3.07 | 26 100 | 5 300 | 4.97 |
| 3-4 | 3 200 | 1 100 | 2.80 | 31 800 | 6 300 | 5.05 |
| 3-5 | 5 900 | 1 900 | 3.12 | 31 900 | 7 400 | 4.31 |
| 3-6 | 8 900 | 2 900 | 3.09 | 27 900 | 19 600 | 1.42 |

The thermal properties found using a Perkin-Elmer Pyris 1 DSC were as follows:

| Example No. | $T_g/°$ C. | $T_c/°$ C. (DH/Jg$^{-1}$) | $T_m/°$ C. (DH/Jg$^{-1}$) |
|---|---|---|---|
| 3-2 | −14 | 94 (−9.6) | 135 (10.7) |
| 3-3 | −12 | 82 (−21.3) | 133 (22.9) |
| 3-4 | −9 | 95 (−2.8) | 134 (6.0) |
| 3-5 | −22 | 84 (−12.7) | 130 (15.0) |
| 3-6 | — | — | — |

$^1$H NMR analysis gave the following results:

| Example No. | $M_n$ a) (g/mol) | Lactide b) (mol %) | CL c) (mol %) |
|---|---|---|---|
| 3-2 | | 4.9 | 17.7 |
| 3-3 | 39 000 | 4.2 | 16.8 |
| 3-4 | 40 000 | 3.1 | 16.9 |
| 3-5 | 32 000 | 3.6 | 23.6 |
| 3-6 | 30 000 | 3.4 | 18.7 | a)Based on end group analysis.
b)Note: 1 mol lactide = 2 mol lactic acid units in polymer.
c)Amount CL units vs. lactic acid units in the polymer.

Furthermore, the following average properties were found.

Weight loss stability (~170° C.): <10% in 8 hours

Extensibility >600% for all samples

It was concluded that the above-mentioned properties of the compounds were fully comparable with that of commercial, non-environmentally degradable glue formulations for hot-melt applications.

EXAMPLE 4

800 g of 88% L-Lactic Acid (Polymer grade PLA ex. Purac) solution is placed with 1.6 g (0.2 wt %) Tin II chloride (Acros) powder into a 1 L pear shaped flask. The flask is attached to a rotary evaporator unit (IKA). An argon purge tube is mounted in the rotary evaporator unit so it rests just below the surface of the lactic acid solution in the flask. An oil bath is set to 180° C. and raised until the pear shaped flask is partially immersed. The vacuum pump attached to the rotary evaporator unit is set to 800 millibar for 1 to 2 hours. The argon is bubbled through the lactic acid solution. The Tin (II) oxide has easily dissolved at 180° C. The liquid will change gradually from a hazy clear solution to a crystal clear solution. The vacuum is gradually increased over the next hour to 100 millibar and the argon also subsequently reduced. After this second hour, the argon flow is stopped and the vacuum increased (or pressure reduced) to the maximum amount (5-10 millibar) and the polycondensation reaction continued for 7 hours. After this time, the vacuum is released by increasing the flow of argon and increasing the vacuum control setting to atmospheric pressure. 150 g of a 4000 Mn polycaprolactone diol (CAPA 240 ex. Solvay) and 12 g of 1,2,3-Benzenetricarboxylic anhydride, 97% (ex. Aldrich) is added to the pear shaped flask after it is removed from the rotary evaporator unit. The vacuum is again set to its maximum value, the oil bath temperature raised to 200° C. and the polycondensation reaction allowed to take place for 4 hours. The final product is a slightly yellow liquid, which upon cooling to room temperature is a flexible solid and has a Mw of 12,400, a Tg of −5° C. and a Tm of 120° C.

The following equipment was used in this example:

IKA rotary evaporator RV06-ML 2-B
IKA oil bath HBR 4 digital
Vacuubrand vacuum pump PC 2004 vario, MD 4C
Vacuubrand PID vacuum regulator.

| Composition: | |
|---|---|
| PGLLA-88 (88%): | 800.0 g |
| Tin (II) chloride: | 1.6 g |
| Capa 240: | 160.0 g |
| 1,2,3-Benzenetricarboxylic anhydride | 12.0 g |

-continued

| "water production" during the polycondensation of 800 g Lactic-acid: | |
|---|---|
| *from the 88% PGLLA | 108.0 g |
| *reaction water | 156.2 g |
| total | 264.2 g |

Compared to example 1 more caprolactone is added which results in a larger excess of hydroxyl groups. The molecular weight that can theoretically be reached is thus lower.

In the table below the effect on the theoretical molecular weight is shown (the theoretical Mn is reached when all carboxylic groups have reacted):

| Percentage capa | 14.5% | 17.5% | 20.0% |
|---|---|---|---|
| Amount of capa | 108 g | 135 g | 160 g |
| Amount of PLA | 636 g | 636 g | 636 g |
| Excess of hydroxyl | 0.054 eq | 0.068 eq | 0.080 eq |
| Hydroxyl Value | 4.07 mgKOH/g | 4.91 mgKOH/g | 5.64 mgKOH/g |
| Mn (theoretical) | 55000 g/mol | 46000 g/mol | 40000 g/mol |

The lower molecular weight will have a negative effect on the flexibility. To avoid this the formulation can be compensated with an extra amount of di, tri or tetra acid (or excess to make the polymer carboxylic functional).

In this example an amount of 1,2,3-Benzenetricarboxylic anhydride is added to the composition. The flexibility and toughness has improved dramatically compared to formulations were no extra acid is added. The increasing flexibility shows even at low molecular weights.

The product can be used as a hot melt adhesive. Trying to separate two pieces of cardboard after they are adhered together results in cardboard tear, which means that the adhesive is stronger than the cardboard. By using a slightly higher percentage of caprolactone in the formulation the open time has improved. Even at lower temperatures this adhesive remains its flexibility. The product can also be used as a coating. After hot spraying a flexible non sticky water-resistant coating will be formed. The product is compostable.

EXAMPLE 5

The following are comparative rheological examples using the ThermoHaake RS300 rheometer equipped with a 20 mm 1° angle cone and 20 mm plate test fixture. The test is conducted using a steady shear mode in which the cone rotates at a fixed speed for a given shear rate. The practical limitations of viscosity measurement for polymeric materials are at the lowest shear rate, the noise or uncertainty in the shear stress, which is related to the measured torque. At the highest shear rate, the limitation is when the material begins to experience nonlaminar flow and the beginning of turbulent flow begins. These boundaries are Mw and temperature dependent. The sampling or measuring time varies with the shear rate range covered during a run and the total duration of time.

For a high Mw polylactide example: A polylactide sample with an Mw=130 000 g/mol and Tm of 170° C. is of the type typically used for extrusion coating of card or paper stock. The measuring temperature for the sample was 180° C. The melt viscosity and shear rate were measured at 1 sec. intervals from 0.1 $s^{-1}$ to 200 $s^{-1}$. The molten polylactide exhibits a slightly shear thinning melt viscosity from 1100 Pa-s down to 800 Pa-s over a shear rate range of 2 s−1 to 40 s−1. From 40 $s^{-1}$ to 90 $s^{-1}$, the melt viscosity shows pronounced shear thinning behavior decreasing from 800 Pa-s to 200 Pa-s. Above 90 $s^{-1}$, the viscosity is not measurable as the sample experiences non-laminar flow and does not remain in the test fixture. This point is observable from the flattening and decrease of the shear stress relative to increasing shear rate.

By contrast, a hot melt base resin made using a similar process as outlined in Example 2, was prepared by polycondensating dehydrated L-lactic acid with succinic anhydride and adding tin chloride as catalyst, to make a Mw of 3000 after 8 hrs. Phosphoric acid was then added as a cocatalyst along with an 8000 Mw polycaprolactone tetrol (CAPA 205042) and trimethylol with additional heat and vacuum to couple by condensation and transesterification the aliphatic polyester tetrol, trimethylol and acid ended polycondensated lactic acid polymer together. At the end of the reaction (24 hrs), this copolymer material reached an Mw of 45,000 g/mol as measured by GPC using polystyrene standards. This copolymer material was a translucent, slightly yellow and slightly tacky, solid at room temperature. It had a Tg of 18° C. and exhibited no melting point.

The melt viscosity for this copolymer material was measured at 5 test temperatures: 100° C., 120° C., 140° C. 160° C., and 180° C. For comparison with the polylactide described previously, the melt viscosity measurements at 100° C. and 180° C. are described next. The melt viscosities were measured using the same RS300 rheometer equipped with the same 20 mm cone and plate test fixture used to measure the high Mw polylactide comparative sample. It was found by practice that the measuring shear rate range for these hot melt base resin copolymers was between 100 $s^{-1}$ and 2000 $s^{-1}$ given the limitations described previously. At 100° C., the melt viscosity was slightly shear thinning across the entire shear rate range of 100 $s^{-1}$ to 800 $s^{-1}$. The melt viscosity decreased from 200 Pa-s at the lowest shear rate to 100 Pa-s at the highest. At a measurement temperature of 180° C., the material was very slightly shear thinning across the measured shear rate range from 250 $s^{-1}$ to 2000 $s^{-1}$. Over this range, the melt viscosity decreased from 3.9 Pa-s down to 2.9 Pa-s.

The invention claimed is:

1. A method for producing an environmentally degradable polymeric compound, suitable for use as a hot melt type application, comprising the steps of polycondensating a lactic acid to form a lactic acid comprising polymer, the said lactic acid comprising polymer having a molecular weight in the range of 500 to 50 000 g/mol and comprising at least 95 mol % of groups derived from lactic acid, and coupling said lactic acid comprising polymer to a flexibilizing aliphatic polyester under at least one of condensation and transesterification reaction conditions, wherein the said flexibilizing aliphatic polyester is a polycaprolactone polyol.

2. The method according to claim 1, wherein said at least one of condensation and transesterification reaction conditions comprise contacting with a catalyst, which catalyst comprises at least one metal selected from antimony, tin (II), tin (IV), iron (II), iron (III), zinc, calcium, magnesium, transition metals and rare earth metals.

3. The method according to claim 2, wherein said catalyst is at least one of stannous oxide, stannous chloride, stannous lactate, stannous 2-ethylhexanoate and zinc lactate.

4. The method according to claim 1, wherein said polycondensated lactic acid comprising polymer and flexibilizing aliphatic polyester are coupled by a coupling agent.

5. The method according to claim 4, wherein said coupling agent is selected from the group consisting of cyclic anhydrides, dicyclic anhydrides, tricyclicanhydrides, tetracyclic anhydrides, polyanhydrides, cyclic ethers, glycidyl ethers, aliphatic isocyanates, aliphatic polyisocyanates, silanes and chlorosilanes.

6. The method according to claim 1, wherein a polymeric compound is produced, which compound comprises 50 to 99 wt. % polylactic acid comprising chains, each of said chains having a molecular weight (Mw) of from 500 to 50 000 g/mol, to which chains a flexibilizing aliphatic polyester having a molecular weight of from 200 to 50 000 g/mol, is coupled, wherein the amount of aliphatic polyester in the compound is 1 to 50 wt. %.

7. The method according to claim 1, wherein the molecular weight of said polylactic acid comprising polymer is from 1500 to 10 000 g/mol.

8. The method according to claim 1, wherein the molecular weight of said flexibilizing aliphatic polyester is from 1000 to 10 000 g/mol.

9. The method according to claim 1, wherein the amount of flexibilizing aliphatic polyester is from 10 to 30 wt. %.

10. The method according to claim 1, wherein said flexibilizing aliphatic polyester is selected from the group consisting of polycaprolactone diol, polycaprolactone triol, polycaprolactone tetrol, polycaprolactone hexyl and combinations thereof.

11. The method according to claim 1, wherein the polylactic acid chains are at least partially crosslinked.

12. The method according to claim 1, wherein said environmentally degradable polymeric compound has a total molecular weight (Mw) of from 700-100 000 g/mol.

13. The method according to claim 1, wherein an environmentally degradable polymeric compound is produced, said environmentally degradable polymeric compound having a softening or melting temperature of less than 120° C.

14. The method according to claim 1, wherein an environmentally degradable polymeric compound is produced, said environmentally degradable polymeric compound having a melt viscosity between 0.1 Pa-s to 400 Pa-s at a shear rate between 100 and 2000 $s^{-1}$ at a measuring temperature of 160° C.

15. A method of impact modification of a composition, comprising adding a compound obtained by the method of claim 1 to at least one of high molecular weight polylactide resins or copolymers of polylactic acid and polyglycolic acid.

16. A method of joining two objects, comprising applying a compound obtained by the method of claim 1 to the two objects as a hot melt adhesive.

17. A hot melt base resin comprising a compound obtained by the method of claim 1.

18. The method of claim 2, wherein the catalyst is combined with an acidic co-catalyst selected from at least one of sulfuric acid, phosphoric acid, hydrochloric acid, methanesulfonic acid and toluene sulfonic acid.

19. The method according to claim 1, wherein an environmentally degradable polymeric compound is produced, which compound comprises 50 to 99 wt. % polylactic acid comprising chains.

20. The method according to claim 11, wherein the polylactic acid chains are at least partially crosslinked via use of an organic peroxide.

21. A method of coating an object, comprising applying to an object a compound obtained by the method of claim 1 as a hot melt coating.

22. The method of claim 21, wherein the compound is applied as a hot melt sprayable coating.

23. The method of claim 21, wherein the compound is applied as a hot melt applied coating.

24. The method according to claim 1, wherein the polymer or copolymer of hydroxycarboxylic acids is substituted with hydroxy groups.

* * * * *

UNITED STATES PATENT AND TRADEMARK OFFICE
CERTIFICATE OF CORRECTION

PATENT NO. : 7,465,770 B2  Page 1 of 1
APPLICATION NO. : 10/469690
DATED : December 16, 2008
INVENTOR(S) : David Neal Lewis et al.

It is certified that error appears in the above-identified patent and that said Letters Patent is hereby corrected as shown below:

In column 19, line 23, delete "hexyl" and insert -- hexol --.

Signed and Sealed this

Tenth Day of February, 2009

JOHN DOLL
*Acting Director of the United States Patent and Trademark Office*